United States Patent
Peretolchin et al.

(10) Patent No.: US 8,623,501 B2
(45) Date of Patent: *Jan. 7, 2014

(54) LIGNOCELLULOSE MATERIALS HAVING GOOD MECHANICAL PROPERTIES

(75) Inventors: Maxim Peretolchin, Mannheim (DE); Günter Scherr, Ludwigshafen (DE); Stephan Weinkötz, Neustadt (DE); Frank Braun, Ludwigshafen (DE); Olaf Kriha, Neustadt (DE); Benjamin Nehls, Ludwigshafen (DE); Michael Schmidt, Dudenhofen (DE); Michael Finkenauer, Westhofen (DE); Jürgen von Auenmüller, Oberhausen-Rheinhausen (DE)

(73) Assignee: BASF SE, Ludwigshafen (DE)

( * ) Notice: Subject to any disclaimer, the term of this patent is extended or adjusted under 35 U.S.C. 154(b) by 217 days.

This patent is subject to a terminal disclaimer.

(21) Appl. No.: 13/038,694

(22) Filed: Mar. 2, 2011

(65) Prior Publication Data

US 2011/0217550 A1 Sep. 8, 2011

Related U.S. Application Data

(60) Provisional application No. 61/310,323, filed on Mar. 4, 2010.

(51) Int. Cl.
*B32B 5/16* (2006.01)

(52) U.S. Cl.
USPC ............ 428/323; 428/402; 428/532; 427/212

(58) Field of Classification Search
USPC ............................. 428/402, 532, 323; 427/212
See application file for complete search history.

(56) References Cited

U.S. PATENT DOCUMENTS

| | | |
|---|---|---|
| 3,998,768 A | 12/1976 | Pettit, Jr. |
| 4,116,804 A | 9/1978 | Needes |
| 4,169,025 A | 9/1979 | Needes |
| 4,251,344 A | 2/1981 | Needes |
| 4,349,612 A | 9/1982 | Baldi |
| 4,396,473 A | 8/1983 | Hughes et al. |
| 4,443,557 A | 4/1984 | Baldi |
| 4,518,457 A | 5/1985 | Gray |
| 5,112,875 A | 5/1992 | Zimmermann et al. |
| 5,464,699 A | 11/1995 | Baldi |
| 5,554,429 A * | 9/1996 | Iwata et al. ............... 428/105 |
| 5,795,659 A | 8/1998 | Meelu et al. |
| 6,099,773 A | 8/2000 | Reck et al. |
| 6,110,262 A | 8/2000 | Kircher et al. |
| 6,348,530 B1 | 2/2002 | Reck et al. |
| 6,596,386 B1 | 7/2003 | Reck et al. |
| 6,727,327 B1 | 4/2004 | Gerst et al. |
| 6,841,608 B1 | 1/2005 | Dreher et al. |
| 7,323,242 B2 | 1/2008 | Gerst et al. |
| 8,187,709 B2 * | 5/2012 | Weinkotz et al. ............ 428/403 |
| 2008/0142436 A1 | 6/2008 | Bothe et al. |
| 2009/0085240 A1 | 4/2009 | Elizalde et al. |
| 2010/0010143 A1 | 1/2010 | Elizalde et al. |
| 2011/0003136 A1 | 1/2011 | Schmidt et al. |
| 2011/0009530 A1 | 1/2011 | Kasmayr et al. |
| 2011/0039090 A1 | 2/2011 | Weinkotz et al. |
| 2011/0065842 A1 | 3/2011 | Weinkoetz et al. |
| 2011/0130080 A1 | 6/2011 | Kasmayr et al. |
| 2011/0171473 A1 | 7/2011 | Kasmayr et al. |
| 2011/0217550 A1 | 9/2011 | Peretolchin et al. |
| 2011/0217562 A1 | 9/2011 | Peretolchin et al. |
| 2012/0064355 A1 | 3/2012 | Kasmayr et al. |
| 2012/0202041 A1 | 8/2012 | Kasmayr et al. |

FOREIGN PATENT DOCUMENTS

| | | |
|---|---|---|
| CA | 2035355 A1 | 8/1991 |
| CA | 2391508 A1 | 5/2001 |
| CH | 370229 A | 6/1963 |
| DE | 7440894 U | 4/1975 |
| DE | 2306771 B2 | 4/1977 |
| DE | 2832509 C2 | 2/1986 |
| DE | 4003422 A1 | 8/1991 |
| DE | 19606393 A1 | 8/1997 |
| DE | 19729161 A1 | 1/1999 |
| DE | 19956420 C1 | 3/2001 |
| DE | 10253498 A1 | 7/2003 |
| DE | 202007017713 U1 | 4/2008 |
| EP | 0012169 B1 | 3/1984 |
| EP | 0346864 B1 | 3/1994 |

(Continued)

OTHER PUBLICATIONS

M. Dunky, P. Niemt, Holzwerkstoffe and Leime, pp. 91-156, Springer Verlag Heidelberg, 2002.
M. Dunky, P. Niemz, Holzwerkstoffe and Leime, Springer 2002, pp. 251-259.
M. Dunky, P. Niemz, Holzwerkstoffe and Leime, Springer 2002, pp. 303-313.
Ullmann's Encyclopedia of Industrial Chemistry, vol. A2, VCH Verlagsgesellschaft, 1985, pp. 115 to 141 "Amino Resins."
U.S. Appl. No. 13/224,731, filed Sep. 2, 2011, Kaesmayr et al.
U.S. Appl. No. 13/313,598, filed Dec. 7, 2011, Kaesmayr et al.
U.S. Appl. No. 61/258,614.
International Search Report for PCT/EP2010/061172 mailed Dec. 6, 2010.
International Search Report for PCT/EP2010/061173 mailed Nov. 17, 2010.

(Continued)

*Primary Examiner* — Leszek Killiman
(74) *Attorney, Agent, or Firm* — Novak Druce Connolly Bove + Quigg LLP

(57) ABSTRACT

A process for the production of a lignocellulose-containing material, in which, based in each case on the lignocellulose-containing material:
A) from 30 to 95% by weight of lignocellulose particles;
B) from 1 to 25% by weight of expanded plastic particles having a bulk density in the range from 10 to 150 kg/m$^3$;
C) from 1 to 50% by weight of a binder selected from the group consisting of aminoplast resin, phenol-formaldehyde resin and organic isocyanate having at least two isocyanate groups, and optionally
D) additives
are mixed and are then pressed at elevated temperature and under elevated pressure, wherein the component B) comprises a formaldehyde scavenger.

21 Claims, No Drawings

(56) References Cited

FOREIGN PATENT DOCUMENTS

| | | | |
|---|---|---|---|
| EP | 0699510 | B1 | 5/1998 |
| EP | 0441196 | B1 | 7/1999 |
| EP | 1240205 | B1 | 3/2004 |
| EP | 1914052 | A1 | 4/2008 |
| EP | 2042560 | A1 | 4/2009 |
| WO | WO-97/31059 | A1 | 8/1997 |
| WO | WO-99/02591 | A1 | 1/1999 |
| WO | WO-00/50480 | A1 | 8/2000 |
| WO | WO-02/38676 | A1 | 5/2002 |
| WO | WO-03035778 | A3 | 1/2004 |
| WO | WO-2006/082223 | A1 | 8/2006 |
| WO | WO-2007/122089 | A | 11/2007 |
| WO | WO-2008/046891 | A | 4/2008 |
| WO | WO-2008/095900 | A1 | 8/2008 |
| WO | WO-2008046892 | A3 | 8/2008 |
| WO | WO-2008148766 | A1 | 12/2008 |
| WO | WO-2009080787 | A1 | 7/2009 |
| WO | WO-2010/018142 | | 2/2010 |
| WO | WO-2010018142 | A1 | 2/2010 |
| WO | WO-2010/031718 | A1 | 3/2010 |
| WO | WO-2011/018372 | | 2/2011 |
| WO | WO-2011/018372 | A1 | 2/2011 |
| WO | WO-2011/018373 | | 2/2011 |
| WO | WO-2011/018373 | A1 | 2/2011 |
| WO | WO-2011018372 | A1 | 2/2011 |
| WO | WO-2011018373 | A1 | 2/2011 |

OTHER PUBLICATIONS

Dunky, et al., Holzwerkstoffe und Leime (2002), pp. 91-157, Springer-Verlag Berlin Heidelberg, Germany.

Dunky, et al., Holzwerkstoffe and Leime, Springer (2002), pp. 251-259.

Dunky, et al., Holzwerkstoffe and Leime, Springer (2002), pp. 303-313.

Ullmann's Enzyklopädie der technischen Chemie, 4th, revised and extended edition, Verlag Chemie, 1973, pp. 403 to 424 "Aminoplaste."

Ullmann's Encyclopedia of Industrial Chemistry, vol. A2, VCH Verlagsgesellschaft, 1985, pp. 115 to 141 "Amino Resins".

Safety Data Sheet "Neopor2400CT".

Safety Data Sheet "Neopor2200".

Safety Data Sheet "Peripor300".

Technische Komission Holzklebstoffe im Industrieverband, 2006, Pages Tabelle 10.

Günter Zeppenfeld, Dirk Grunwald, Klebstoffe in der Holz- und Mobelindusirie, vol. 2, pp. 268.

Ullmann's Encyclopedia, 1996, vol. 4, pp. 567-598.

Hauser, Kunststoff-Handbuch, 1996, vol. 4, pp. 640-673.

Hanser, "Duroplaste", Kunststoff-Handbuch, 1988, vol. 10, pp. 12-40.

Becker/Braun, Kunstsoff Handbuch, 1993, vol. 3, Issue 7, pp. 17-21.

Becker/Braun, Kunststoff Handbuch, 1993, vol. 3, Issue 7, pp. 76-88.

Becker/Braun, Kunststoff Handbuch, 1993, vol. 3, Issue 7, pp. 665-671.

\* cited by examiner

LIGNOCELLULOSE MATERIALS HAVING GOOD MECHANICAL PROPERTIES

CROSS REFERENCE TO RELATED APPLICATIONS

This application is a non-provisional application, which claims benefit to U.S. provisional application 61/310,323, filed Mar. 4, 2010, the entire disclosure of which is hereby incorporated by reference.

The present invention relates to a process for the production of a lignocellulose-containing material, in which, based in each case on the lignocellulose-containing material:
A) from 30 to 95% by weight of lignocellulose particles;
B) from 1 to 25% by weight of expanded plastic particles having a bulk density in the range from 10 to 150 kg/m$^3$;
C) from 1 to 50% by weight of a binder selected from the group consisting of aminoplast resin, phenol-formaldehyde resin and organic isocyanate having at least two isocyanate groups, and optionally
D) additives are mixed and are then pressed at elevated temperature and under elevated pressure, wherein the component B) comprises a formaldehyde scavenger.

The sum of the components A), B), C) and optionally D) is 100%.

The present invention furthermore relates to a process for the production of a multilayer lignocellulose material, the lignocellulose-containing material, a multilayer lignocellulose material and the use of a lignocellulose-containing material and of a multilayer lignocellulose material, in each case as defined in the claims.

Lignocellulose materials, for example wood-base materials, in particular multilayer wood-base materials, are an economical and resource-protecting alternative to solid wood and have become very important, particularly in furniture construction, in the case of laminate floors and as construction materials. Starting materials used are usually wood particles of different thicknesses, for example wood chips or wood fibers of various timbers. Such wood particles are usually pressed with natural and/or synthetic binders and optionally with addition of further additives to give board- or strand-like wood-base materials.

The production of such lignocellulose materials, for example wood-base materials, is known and is described, for example, in M. Dunky, P. Niemz, Holzwerkstoffe und Leime, Springer 2002, pages 91-155.

Usually, lignocellulose particles, for example wood chips or wood fibers, are treated with so-called binders, for example aminoplast resins or phenol-formaldehyde resins, and compressed in a press at elevated temperature and cured.

The corresponding moldings, for example particle boards or fiber boards, may emit formaldehyde. Formaldehyde is undesired in the environment. Its emission, for example from wood-base materials, should therefore be reduced as far as possible or even completely prevented.

Usually, a so-called formaldehyde scavenger, for example chemical compounds having amine or amide groups or sulfur groups, which binds with formaldehyde and thus reduces or prevents the emission of formaldehyde, is added to the form-aldehyde-containing binders for this purpose. However, such added formaldehyde scavengers have the disadvantage that they delay the curing of the formaldehyde-containing glue, which in turn has disadvantageous effects on the cost-efficiency of the production of the wood-base materials and/or adversely affects the mechanical properties thereof.

For many applications, for example in the bathroom furniture sector or generally in construction, in humid climates, lignocellulose materials having improved mechanical properties, for example improved transverse tensile strength, and lower water absorption or swelling values are sought. Such wood-base materials, too, should have as low a formaldehyde emission as possible.

The prior art contains proposals for modifying wood-base materials by additions of filler polymers to the glue or to the wood particles.

Thus, DE 20 2007 017 713 U1 describes a weight-reduced particle board by combination of wood chips and uniformly distributed foamed polystyrene beads in the middle layer of the particle board.

The polystyrene can be used as a carrier of additives, such as formaldehyde scavengers, accelerators and flameproofing agents. The accelerators added to the polystyrene can have a positive effect on the process speed. Formaldehyde scavengers, accelerators and flameproofing agents are generically named.

The object of the present invention was to provide lignocellulose-containing, preferably wood-containing, materials and lignocellulose materials, preferably wood-base materials, having improved mechanical properties and low water absorption and swelling values but still having good processing properties, such as conventional wood-base materials of the same density, which however have a reduced formaldehyde emission or even virtually no formaldehyde emission.

The object was achieved by a process for the production of a lignocellulose-containing material, in which, based in each case on the lignocellulose-containing material:
A) from 30 to 95% by weight of lignocellulose particles;
B) from 1 to 25% by weight of expanded plastic particles having a bulk density in the range from 10 to 150 kg/m$^3$;
C) from 1 to 50% by weight of a binder selected from the group consisting of aminoplast resin, phenol-formaldehyde resin and organic isocyanate having at least two isocyanate groups and optionally
D) additives are mixed and are then pressed at elevated temperature and under elevated pressure, wherein the component B) comprises a formaldehyde scavenger.

The terms lignocellulose, lignocellulose particles or lignocellulose-containing material are known to the person skilled in the art.

Here, lignocellulose-containing material, lignocellulose-containing particles or lignocellulose particles are, for example, straw or wood parts such as wood layers, wood strips, wood chips, wood fibers or wood dust, wood chips, wood fibers and wood dust being preferred. The lignocellulose-containing particles or lignocellulose particles may also originate from wood fiber-containing plants, such as flax, hemp.

Starting materials for wood parts or wood particles are usually timbers from the thinning of forests, industrial residual timbers and used timbers as well as wood fiber-containing plants.

The processing to give the desired lignocellulose-containing particles, for example wood particles, is effected by known processes, cf. for example M. Dunky, P. Niemt, Holzwerkstoffe and Leime, pages 91-156, Springer Verlag Heidelberg, 2002.

Preferred lignocellulose-containing particle are wood particles, particularly preferably wood chips and wood fibers, as are used for the production of particle boards and MDF and HDF boards.

Other suitable lignocellulose-containing particles are flax or hemp particles, particularly preferably flax or hemp fibers, as can be used for the production of MDF and HDF boards.

The lignocellulose-containing, preferably wood-containing material may comprise the customary small amounts of water (within a customary small range of variation); this water is not taken into account in the weight data of the present application.

The weight data of the lignocellulose particles, preferably wood particles, are based on lignocellulose particles, preferably wood particles, dried in a customary manner known to the person skilled in the art.

The weight data of the binder are based, with respect to the aminoplast component in the binder, on the solids content of the corresponding component (determined by evaporation of the water at 120° C. within 2 h, according to, for example, Günter Zeppenfeld, Dirk Grunwald, Klebstoffe in der Holz- and Möbelindustrie, 2nd edition, DRW-Verlag, page 268) and, with respect to the isocyanate, in particular the PMDI, on the isocyanate component per se, i.e. for example without solvent or emulsifying medium.

The lignocellulose-containing, preferably wood-containing materials according to the invention can have any density.

Usually, more highly dense lignocellulose-containing, preferably wood-containing materials according to the invention have an average density in the range from at least 600 to 900 kg/m$^3$, preferably from 600 to 850 kg/m$^3$, particularly preferably from 600 to 800 kg/m$^3$.

Usually, low-density lignocellulose-containing, preferably wood-containing materials according to the invention have an average density in the range from 200 to 600 kg/m$^3$, preferably from 300 to 600 kg/m$^3$, particularly preferably from 350 to 500 kg/m$^3$.

Suitable multilayer lignocellulose materials, preferably multilayer wood-base materials are all materials which are produced from wood veneers, preferably having an average density of the wood veneers of from 0.4 to 0.85 g/cm$^3$, for example veneer boards or plywood boards or Laminated Veneer Lumber (LVL).

Suitable multilayer lignocellulose materials, preferably multilayer wood-base materials, are preferably all materials which are produced from lignocellulose chips, preferably wood chips, preferably having an average density of the wood chips of from 0.4 to 0.85 g/cm$^3$, for example particle boards or OSB boards, and wood fiber materials such as LDF, MDF and HDF boards. Particle boards and fiber boards are preferred, in particular particle boards.

The average density of the lignocellulose particles, preferably of the wood particles, of component A) is as a rule from 0.4 to 0.85 g/cm$^3$, preferably from 0.4 to 0.75 g/cm$^3$, in particular from 0.4 to 0.6 g/cm$^3$.

Any desired wood type is suitable for the production of the wood particles; for example, spruce, beech, pine, larch, linden, poplar, ash, chestnut or fir wood are very suitable, and spruce and/or beech wood are preferred, in particular spruce wood.

The dimensions of the lignocellulose particles, preferably wood particles, are not critical and depend as usual on the lignocellulose material, preferably wood-base material, to be produced, for example the abovementioned wood-base materials, such as particle board, MDF, HDF or OSB.

Component B) comprises expanded plastic particles, preferably expanded thermoplastic particles, which comprise a formaldehyde scavenger.

Formaldehyde scavengers are to be understood as meaning all chemical compounds of any molecular weight which as a rule have a free electron pair which reacts chemically with the formaldehyde, i.e. binds the formaldehyde chemically, as a rule practically irreversibly. Such free electron pairs are to be found, for example, on the following functional groups of organic or inorganic compounds: primary, secondary and tertiary amino group, hydroxyl group, sulfite group, amides, imines, imides.

A preferred group of formaldehyde scavengers is that which comprises chemical compounds of any molecular weight, the chemical compounds comprising at least one N atom having at least one free electron pair, for example: ammonia, urea, melamine, organic $C_1$-$C_{10}$-amines, polymers which carry at least one amino group, such as polyamines, polyimines, polyureas, polylysines, polyvinylamine and polyethylenimine.

A further preferred group of formaldehyde scavengers comprises sulfur-containing salts, such as alkali metal sulfite, for example sodium sulfite; alkali metal thiosulfate, for example sodium thiosulfate, or salts of organic sulfur compounds, for example thiocarboxylates.

Component B) is usually prepared as follows:

Either the plastic particles on which component B) is based, in the form of compact plastic particles (also referred to as "expandable plastic particles"), are brought into contact with the formaldehyde scavenger, either after the production of the plastic particles or in the course of the production of the plastic particles (both "variant I") or the plastic particles on which component B) is based, in the form of expanded plastic particles, are brought into contact with the formaldehyde scavenger ("variant II").

A suitable embodiment of variant I is the production of the plastic particles on which component B) is based in an extruder, the formaldehyde scavenger additionally being metered into the extruder so that, after the extrusion step, a bead-like expandable coextrudate comprising plastic and formaldehyde scavenger is present.

This coextrudate can furthermore be brought into contact, both in its expandable form and preferably in its expanded form, with a curing agent for the binder C), analogously to the description below for formaldehyde scavengers.

Curing agent for the binder C) is to be understood here as meaning all chemical compounds of any molecular weight which produce or accelerate the polycondensation of aminoplast resin or phenol-formaldehyde resin.

A suitable group of curing agents for aminoplast resin or phenol-formaldehyde resin comprises organic acids, inorganic acids, acidic salts of organic acids and acidic salts of inorganic acids, such as ammonium salts or acidic salts of organic amines. The components of this group can of course also be used as mixtures.

A preferred group of curing agents for aminoplast resin or phenol-formaldehyde resin comprises inorganic or organic acids, such as nitric acid, sulfuric acid, formic acid, acetic acid, and polymers having acid groups, such as homo- or copolymers of acrylic acid or methacrylic acid or maleic acid.

Further examples of curing agents for aminoplast resins are to be found in M. Dunky, P. Niemz, Holzwerkstoffe und Leime, Springer 2002, pages 265-269, and further examples of curing agents for phenol-formaldehyde resins are to be found in M. Dunky, P. Niemz, Holzwerkstoffe und Leime, Springer 2002, pages 341-352.

Variant (II) is preferably used.

Formaldehyde scavengers I) which adhere to the plastic particles on which component B) is based are usually brought into contact as such or in solution or suspension in a diluent, for example water and/or organic solvents, with the plastic particles on which component B) is based.

The adhesion of the formaldehyde scavenger I) to the plastic particles on which component B) is based takes place for example as a result of the intrinsic adhesive properties of the formaldehyde scavengers I) or by virtue of the fact that the formaldehyde scavengers I) thicken, polymerize or undergo polycondensation and, for example, cure during or after said bringing into contact.

Examples of such formaldehyde scavengers I) are those substances which can form a layer, preferably a solid nontacky layer, on the plastic particles on which component B) is based, for example amines solid at room temperature or urea and derivatives thereof, furthermore polyamines, such as polyvinylamine, polyimines, such as polyethylenimine, and polyureas and solid reaction products of melamine and/or urea with amines, for example those as described in WO2009080787 or in WO2008148766, which are hereby incorporated by reference.

Formaldehyde scavengers II) which do not adhere to the plastic particles on which component B) is based are usually combined with an adhesive.

Here, "do not adhere" means that the corresponding curing agent in solid form, for example powder, or liquid form becomes detached in a substantial amount from the plastic particles on which component B) is based, even as a result of a low mechanical load.

Examples of such formaldehyde scavengers II) are as a rule crystalline low molecular weight organic substances, such as urea or sulfur-containing salts, such as alkali metal sulfite, for example sodium sulfite; alkali metal thiosulfate, for example sodium thiosulfate.

The following components by themselves or in combination with one another can be used as adhesives, the mixing ratios not being critical.

Polymers based on monomers such as vinylaromatic monomers, such as α-methylstyrene, p-methylstyrene, ethylstyrene, tert-butylstyrene, vinylstyrene, vinyltoluene, 1,2-diphenylethylene, 1,1-diphenylethylene, alkenes, such as ethylene or propylene, dienes, such as 1,3-butadiene, 1,3-pentadiene, 1,3-hexadiene, 2,3-dimethylbutadiene, isoprene, piperylene or isoprene, α,β-unsaturated carboxylic acids, such as acrylic acid or methacrylic acid, esters thereof, in particular alkyl esters, such as C1-10-alkyl esters of acrylic acid, in particular the butyl esters, preferably n-butyl acrylate, and the C1-10-alkyl esters of methacrylic acid, in particular methyl methacrylate (MMA), or carboxamides, for example acrylamide and methacrylamide.

The polymers can optionally comprise from 1 to 5% by weight of comonomer, such as (meth)acrylonitrile, (meth)acrylamide, ureido (meth)acrylate, 2-hydroxyethyl (meth)acrylate, 3-hydroxypropyl (meth)acrylate, acrylamidopropanesulfonic acid, methylolacrylamide or the sodium salt of vinylsulfonic acid.

The polymers of the adhesives are preferably composed of one or more of the monomers styrene, butadiene, acrylic acid, methacrylic acid, C1-4-alkyl acrylates, C1-4-alkyl methacrylates, acrylamide, methacrylamide and methylolacrylamide.

Suitable adhesives for the formaldehyde scavengers II) are in particular acrylate resins, particularly preferably in the form of the aqueous polymer dispersion.

Furthermore, resins such as aminoplast resins, polyurethanes, alkyd resins and other resins which are used, for example, in coatings or paints and can form a stable layer can also be used as adhesive for the formaldehyde scavengers II).

The abovementioned adhesives are usually brought into contact as such or in solution or suspension in a diluent, for example water and/or organic solvents, with the formaldehyde scavenger II) or the formaldehyde scavengers II).

The preparation of the adhesive polymer dispersion or suspension is effected in a manner known per se, for example by emulsion, suspension or dispersion polymerization, preferably in the aqueous phase. The polymer can also be prepared by solution or mass polymerization, and optionally comminuted and the polymer particles can then be dispersed in water in the customary manner.

Suitable polymer dispersions are obtainable, for example, by free radical emulsion polymerization of ethylenically unsaturated monomers, such as styrene, acrylates or methacrylates, as described in WO 00/50480. Acrylates or styrene acrylates which are composed of the monomers styrene, n-butyl acrylate, methyl methacrylate (MMA), methacrylic acid, acrylamide or methylolacrylamide are particularly preferred.

Urea, sulfur-containing salts, such as alkali metal sulfite, for example sodium sulfite; alkali metal thiosulfate, for example sodium thiosulfate, are preferably used as formaldehyde scavenger II) and an aqueous dispersion of a polymer based on: acrylate and styrene, for example ACRONAL® S 305 D of BASF SE, is preferably used as an adhesive for formaldehyde scavenger II).

Furthermore, formaldehyde scavenger I) can be used as an adhesive for formaldehyde scavenger II).

Formaldehyde scavenger I) and formaldehyde scavenger II) or formaldehyde scavenger II) and the adhesive described above or formaldehyde scavenger I) and formaldehyde scavenger II) and optionally the adhesive described above can be mixed and can be brought into contact with the plastic particles on which component B) is based, or first the plastic particles on which component B) is based can be brought into contact with the formaldehyde scavenger I) and/or the adhesive described above and said particles can then be brought into contact with the formaldehyde scavenger II).

The bringing into contact can be effected by the customary methods, for example by spraying, immersion, wetting or drum-coating of the plastic particles on which component B) is based with the optionally dissolved or suspended, further components, namely formaldehyde scavenger I) and/or formaldehyde scavenger II) and/or the adhesive described above. The plastic particles on which component B) is based are present here usually as such, i.e. as solid substance.

The content of formaldehyde scavenger in and/or on component B) is usually in the range from 0.5 to 100% by weight of formaldehyde scavenger, preferably in the range from 1 to 80% by weight, particularly preferably in the range from 5 to 40% by weight, of formaldehyde scavenger, based in each case on component B).

The expanded plastic particles on which component B) is based are usually obtained as follows: compact plastic particles which comprise an expandable medium (also referred to as "blowing agent") are expanded by the action of heat energy or pressure change (often also designated as "foamed"). The blowing agent expands thereby, the particles increase in size and cell structures form.

This expansion is generally carried out in customary foaming apparatuses, often designated as "preexpanders". Such preexpanders can be installed in a stationary manner or can be mobile.

The expansion can be carried out in one stage or in a plurality of stages. As a rule, in the one-stage process, the expandable plastic particles are expanded directly to the desired final size.

As a rule, in the multistage process, the expandable plastic particles are first expanded to an intermediate size and then expanded to the desired final size in one or more further stages via a corresponding number of intermediate sizes.

The abovementioned compact plastic particles, also referred to herein as "expandable plastic particles", comprise as a rule no cell structures, in contrast to the expanded plastic particles.

As a rule, the expanded plastic particles have, if any at all, only a small content of blowing agent.

The expanded plastic particles thus obtained can be temporarily stored or can be further used without intermediate steps for the preparation of component B) according to the invention, as described above.

Suitable polymers on which the expandable or expanded plastic particles are based are all polymers, preferably thermoplastic polymers, which can be foamed. These are known to the person skilled in the art.

Suitable such polymers are, for example, polyketones, polysulfones, polyoxymethylene, PVC (rigid and flexible), polycarbonates, polyisocyanurates, polycarbodiimides, polyacrylimides and polymethacrylimides, polyamides, polyurethanes, aminoplast resins and phenol resins, styrene homopolymers (also referred to below as "polystyrene" or "styrene polymer"), styrene copolymers, $C_2$-$C_{10}$-olefin homopolymers, $C_2$-$C_{10}$-olefin copolymers and polyesters.

The 1-alkenes, for example ethylene, propylene, 1-butene, 1-hexene, 1-octene, are preferably used for the preparation of said olefin polymers.

The expanded plastic particles of component B) have a bulk density of from 10 to 150 kg/m$^3$, preferably from 30 to 100 kg/m$^3$, particularly preferably from 40 to 80 kg/m$^3$, in particular from 50 to 70 kg/m$^3$. The bulk density is usually determined by weighing a defined volume filled with the bulk material.

Expanded plastic particles B) are generally used in the form of spheres or beads having an average diameter of, advantageously, from 0.25 to 10 mm, preferably from 0.4 to 8.5 mm, in particular from 0.4 to 7 mm.

Expanded plastic particle spheres B) advantageously have a small surface area per unit volume, for example in the form of a spherical or elliptical particle.

The expanded plastic particle spheres B) advantageously have closed cells. The proportion of open cells according to DIN-ISO 4590 is as a rule less than 30%.

If component B) consists of different polymer types, i.e. polymer types based on different monomers (for example polystyrene and polyethylene or polystyrene and homopolypropylene or polyethylene and homopolypropylene), they may be present in different weight ratios, which however, according to the present state of knowledge, are not critical.

Furthermore, the customary additives on which the expandable or expanded plastic particles B) are based, for example UV stabilizers, antioxidants, coating materials, water repellents, nucleating agents, plasticizers, flameproofing agents, soluble and insoluble inorganic and/or organic dyes, pigments and athermanous particles, such as carbon black, graphite or aluminum powder, can be added as additives, together or spatially separately, to the polymers, preferably the thermoplastics.

All blowing agents known to the person skilled in the art, for example aliphatic $C_3$- to $C_{10}$-hydrocarbons, such as propane, n-butane, isobutane, n-pentane, isopentane, neopentane, cyclopentane and/or hexane and isomers thereof, alcohols, ketones, esters, ethers and halogenated hydrocarbons, can be used for the expanded or expandable plastic particles.

The content of blowing agent in the expandable plastic particles is in general in the range from 0.01 to 7% by weight, preferably from 0.01 to 4% by weight, particularly preferably from 0.1 to 4% by weight, based in each case on the expandable plastic particles containing blowing agent.

Styrene homopolymer (also referred to herein simply as "polystyrene") and/or styrene copolymer is preferably used as the only plastic particle component in component B).

Such polystyrene and/or styrene copolymer can be prepared by all polymerization processes known to the person skilled in the art, cf. for example Ullmann's Encyclopedia, Sixth Edition, 2000 Electronic Release, or Kunststoff-Handbuch 1996, volume 4 "Polystyrol", pages 567 to 598.

The preparation of the expandable polystyrene and/or styrene copolymer is effected as a rule in a manner known per se by suspension polymerization or by means of extrusion processes.

In the suspension polymerization, styrene, optionally with addition of further comonomers, is polymerized in aqueous suspension in the presence of a customary suspension stabilizer by means of catalysts forming free radicals. The blowing agent and optionally further customary additives can be concomitantly initially taken in the polymerization or added to the batch in the course of the polymerization or after the end of the polymerization. The bead-like, expandable styrene polymers obtained, which are impregnated with blowing agent, are separated from the aqueous phase after the end of the polymerization, washed, dried and screened.

In the extrusion process, the blowing agent is mixed into the polymer, for example via an extruder, transported through a die plate and pelletized under pressure to give particles or strands.

Blowing agents which may be used for the preparation of the expandable polystyrene and/or styrene copolymer are all blowing agents known to the person skilled in the art and already mentioned above, for example aliphatic $C_3$- to $C_{10}$-hydrocarbons, such as propane, n-butane, isobutane, n-pentane, isopentane, neopentane, cyclopentane and/or hexane and isomers thereof, alcohols, ketones, esters, ethers or halogenated hydrocarbons.

Preferably, the blowing agent is selected from the group consisting of n-pentane, isopentane, neopentane and cyclopentane. A commercially available pentane isomer mixture comprising n-pentane and isopentane is particularly preferably used.

The content of blowing agent in the expandable polystyrene or styrene copolymer is in general in the range from 0.01 to 7% by weight, preferably from 0.01 to 4% by weight, preferably from 0.1 to 4% by weight, particularly preferably from 0.5 to 3.5% by weight, based in each case on the expandable polystyrene or styrene copolymer containing blowing agent.

The content of $C_3$- to $C_{10}$-hydrocarbons as blowing agents in the expandable polystyrene or styrene copolymer is in general in the range from 0.01 to 7% by weight, preferably from 0.01 to 4% by weight, preferably from 0.1 to 4% by weight, particularly preferably from 0.5 to 3.5% by weight, based in each case on the expandable polystyrene or styrene copolymer containing blowing agent.

The content of blowing agent, selected from the group consisting of n-pentane, isopentane, neopentane and cyclopentane, in the expandable polystyrene or styrene copolymer is in general in the range from 0.01 to 7% by weight, preferably from 0.01 to 4% by weight, preferably from 0.1 to 4% by weight, particularly preferably from 0.5 to 3.5% by weight, based in each case on the expandable polystyrene or styrene copolymer containing blowing agent.

The content of blowing agent, selected from the group consisting of n-pentane, isopentane, neopentane and cyclopentane, in the expandable polystyrene is in general in the range from 0.01 to 7% by weight, preferably from 0.01 to 4% by weight, preferably from 0.1 to 4% by weight, particularly preferably from 0.5 to 3.5% by weight, based in each case on the expandable polystyrene containing blowing agent.

The preferred or particularly preferred expandable styrene polymers or expandable styrene copolymers described above have a relatively low content of blowing agent. Such polymers are also referred to as "being low in blowing agent". A suitable process for the preparation of expandable polystyrene or expandable styrene copolymer low in blowing agent is described in U.S. Pat. No. 5,112,875, which is hereby incorporated by reference.

Furthermore, customary additives, for example UV stabilizers, antioxidants, coating materials, water repellents, nucleating agents, plasticizers, flameproofing agents, soluble and insoluble inorganic and/or organic dyes, pigments and athermanous particles, such as carbon black, graphite or aluminum powder, can be added as additives, together or spatially separately, to the styrene polymers or styrene copolymers.

As described, it is also possible to use styrene copolymers. These styrene copolymers advantageously have at least 50% by weight, preferably at least 80% by weight, of styrene incorporated in the form of polymerized units. Suitable comonomers are, for example, α-methylstyrene, styrenes halogenated on the nucleus, acrylonitrile, esters of acrylic or methacrylic acid with alcohols having 1 to 8 carbon atoms, N-vinylcarbazole, maleic acid (anhydride), (meth)acrylamides and/or vinyl acetate.

Advantageously, the polystyrene and/or styrene copolymer may comprise a small amount of a chain branching agent in the form of polymerized units, i.e. a compound having more than one double bond, preferably two double bonds, such as divinylbenzene, butadiene and/or butanediol diacrylate. The branching agent is used in general in amounts of from 0.0005 to 0.5 mol %, based on styrene.

Styrene polymers or styrene copolymers having a molecular weight in the range from 70 000 to 400 000 g/mol, particularly preferably from 190 000 to 400 000 g/mol, very particularly preferably from 210 000 to 400 000 g/mol, are preferably used.

Mixtures of different styrene (co)polymers may also be used.

Suitable styrene homopolymers or styrene copolymers are crystal clear polystyrene (GPPS), high impact polystyrene (HIPS), anionically polymerized polystyrene or impact-resistant polystyrene (A-IPS), styrene-α-methylstyrene copolymers, acrylonitrile-butadiene-styrene polymers (ABS), styrene-acrylonitrile (SAN), acrylonitrile-styrene-acrylate (ASA), methylacrylate-butadiene-styrene (MBS), methyl methacrylate-acrylonitrile-butadiene-styrene (MABS) polymers or mixtures thereof or with polyphenylene ether (PPE) used.

A styrene homopolymer having a molecular weight in the range from 70 000 to 400 000 g/mol, particularly preferably from 190 000 to 400 000 g/mol, very particularly preferably from 210 000 to 400 000 g/mol, is particularly preferably used.

For the preparation of expanded polystyrene as component B) and/or expanded styrene copolymer as component B), in general the expandable styrene homopolymers or expandable styrene copolymers are expanded (often also referred to as "foamed") in a known manner by heating to temperatures above their softening point, for example by means of hot air or preferably steam and/or pressure change, as described, for example, in Kunststoff Handbuch 1996, volume 4 "Polystyrol", Hanser 1996, pages 640 to 673, or U.S. Pat. No. 5,112, 875. The expandable polystyrene or expandable styrene copolymer is obtainable as a rule in a manner known per se by suspension polymerization or by means of extrusion processes as described above.

On expansion, the blowing agent expands, the polymer particles increase in size and cell structures form.

This expansion is generally carried out in customary foaming apparatuses, often referred to as "preexpanders". Such preexpanders can be installed in a stationary manner or may be mobile.

The expansion can be carried out in one stage or a plurality of stages. As a rule, in the one-stage process, the expandable polystyrene particles or expandable styrene copolymer particles are expanded directly to the desired final size.

As a rule, in the multistage process, the polystyrene particles or expandable styrene copolymer particles are first expanded to an intermediate size and then, in one or more further stages, expanded via a corresponding number of intermediate sizes to the desired final size.

Preferably, the expansion is carried out in one stage.

The expandable polystyrene particles (styrene homopolymer particles) or expandable styrene copolymer particles comprise as a rule no cell structures, in contrast to the expanded polystyrene particles or expanded styrene copolymer particles.

The content of blowing agent in the expanded polystyrene or expanded styrene copolymer, preferably styrene homopolymer, is in general in the range from 0 to 5.5% by weight, preferably from 0 to 3% by weight, preferably from 0 to 2.5% by weight, particularly preferably from 0 to 2% by weight, based in each case on the expanded polystyrene or expanded styrene copolymer.

Here, 0% by weight means that no blowing agent can be detected by the customary detection methods.

These expanded polystyrene particles or expanded styrene copolymer particles can be further used for the production of the lignocellulose-containing material with or without further measures for blowing agent reduction.

The expanded polystyrene particles or expanded styrene copolymer particles obtained in this manner are preferably further used without further intermediate steps for the preparation of component B) according to the invention, as described above.

The expanded polystyrene or expanded styrene copolymer advantageously has a bulk density of from 10 to 100 kg/m$^3$, preferably from 45 to 100 kg/m$^3$, particularly preferably from 45 to 80 kg/m$^3$, in particular from 50 to 70 kg/m$^3$.

The expanded polystyrene or expanded styrene copolymer is advantageously used in the form of spheres or beads having an average diameter in the range from 0.25 to 10 mm, preferably in the range from 1 to 8.5 mm, in particular in the range from 1.2 to 7 mm.

The expanded polystyrene and/or expanded styrene copolymer spheres advantageously have a small surface area per unit volume, for example in the form of a spherical or elliptical particle.

The expanded polystyrene or expanded styrene copolymer spheres advantageously have closed cells. The proportion of open cells according to DIN-ISO 4590 is as a rule less than 30%.

Usually, the expandable polystyrene or expandable styrene copolymer or the expanded polystyrene or expanded styrene copolymer has an antistatic coating.

The expanded plastic particles B) are as a rule present in a virtually unfused state even after the pressing to give the lignocellulose material, preferably wood-base material, preferably multilayer lignocellulose material, particularly preferably multilayer wood-base material. This means that the plastic particles B) have as a rule not penetrated into the lignocellulose particles or have not impregnated them but are distributed between the lignocellulose particles. Usually, the plastic particles B) can be separated from the lignocellulose by physical methods, for example after comminution of the lignocellulose material.

The total amount of expanded plastic particles B), based on the lignocellulose-containing, preferably wood-containing material, is in the range from 1 to 25% by weight, preferably from 3 to 20% by weight, particularly preferably from 5 to 15% by weight.

The total amount of expanded plastic particles B) with polystyrene and/or styrene copolymer as the only plastic particle component, based on the lignocellulose-containing, preferably wood-containing material, is in the range from 1 to 25% by weight, preferably from 3 to 20% by weight, particularly preferably from 5 to 15% by weight.

The tailoring of the dimensions of the expanded plastic particles B) described above to the lignocellulose particles, preferably wood particle A) or vice versa has proved to be advantageous.

This tailoring is expressed below by the relationship of the respective d' values (from the Rosin-Rammler-Sperling-Bennet function) of the lignocellulose particles, preferably wood particles A) and of the expanded plastic particles B).

The Rossin-Rammler-Sperling-Bennet function is described, for example, in DIN 66145.

For determining the d' value, sieve analyses are first carried out for determining the particle size distribution of the expanded plastic particles B) and lignocellulose particles, preferably wood particles, A), analogously to DIN 66165, parts 1 and 2.

The values from the sieve analysis are then used in the Rosin-Rammler-Sperling-Bennet function and d' is calculated.

The Rosin-Rammler-Sperling-Bennet function is:

$$R=100*\exp(-(d/d')^n)$$

with the following meanings for the parameter:
R residue (% by weight) which remains on the respective sieve tray
d particle size
d' particle size at 36.8% by weight of residue
n width of the particle size distribution Suitable lignocellulose particles, preferably wood particles A) have a d' value, according to Rosin-Rammler-Sperling-Bennet (definition and determination of the d' value as described above), in the range from 0.1 to 5.0, preferably in the range from 0.3 to 3.0 and particularly preferably in the range from 0.5 to 2.75.

Suitable lignocellulose-containing, preferably wood-containing materials or multilayer lignocellulose materials, preferably multilayer wood-base materials, are obtained if the following relationship is true for the d' values, according to Rosin-Rammler-Sperling-Bennet, of the lignocellulose particles, preferably wood particles A) and the particles of the expanded plastic particles B):

d' of particles A)≤2.5×d' of particles B), preferably
d' of particles A)≤2.0×d' of particles B), particularly preferably
d' of particles A)≤1.5×d' of particles B), very particularly preferably
d' of particles A)≤d' of particles B).

The binder C) is selected from the group consisting of aminoplast resin, phenol-formaldehyde resin and organic isocyanate having at least two isocyanate groups. In the present application, the absolute and percentage quantity data with regard to component C) relate to these components.

The binder C) can, in addition to component B), comprise the curing agents known to the person skilled in the art.

For example, for aminoplast or phenol-formaldehyde resins, these are ammonium sulfate or ammonium nitrate or inorganic or organic acids, for example sulfuric acid, formic acid, or acid-generating substances, such as aluminum chloride, aluminum sulfate, in each case in the customary, small amounts, for example in the range from 0.1% by weight to 3% by weight, based on the total amount of aminoplast resin or phenol-formaldehyde resin in binder C).

Phenol-formaldehyde resins (also referred to as PF resins) are known to the person skilled in the art, cf. for example Kunststoff-Handbuch, 2nd edition, Hanser 1988, volume 10 "Duroplaste", pages 12 to 40.

Here, aminoplast resin is understood as meaning polycondensates of compounds having at least one carbamide group optionally partly substituted by organic radicals (the carbamide group is also referred to as carboxamide group) and an aldehyde, preferably formaldehyde.

All aminoplast resins known to the person skilled in the art, preferably for the production of wood-base materials, can be used as suitable aminoplast resin. Such resins and their preparation are described, for example, in Ullmanns Enzyklopädie der technischen Chemie, 4th, revised and extended edition, Verlag Chemie, 1973, pages 403 to 424 "Aminoplaste" and Ullmann's Encyclopedia of Industrial Chemistry, Vol. A2, VCH Verlagsgesellschaft, 1985, pages 115 to 141 "Amino Resins", and in M. Dunky, P. Niemz, Holzwerkstoffe and Leime, Springer 2002, pages 251 to 259 (UF resins) and pages 303 to 313 (MUF and UF with small amount of melamine).

Preferred aminoplast resins are polycondensates of compounds having at least one carbamide group, also partly substituted by organic radicals, and formaldehyde.

Particularly preferred aminoplast resins are urea-formaldehyde resins (UF resins), melamine-formaldehyde resins (MF resins) or melamine-containing urea-formaldehyde resins (MUF resins).

Very particularly preferred aminoplast resins are urea-formaldehyde resins, for example Kaurit® glue types from BASF SE.

Further very preferred aminoplast resins are polycondensates of compounds having at least one amino group, also partly substituted by organic radicals, and aldehyde, wherein the molar ratio of aldehyde to amino group optionally partly substituted by organic radicals is in the range from 0.3 to 1.0, preferably from 0.3 to 0.60, particularly preferably from 0.3 to 0.45, very particularly preferably from 0.30 to 0.40.

Further very preferred aminoplast resins are polycondensates of compounds having at least one amino group —NH$_2$ and formaldehyde, wherein the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Further very preferred aminoplast resins are urea-formaldehyde resins (UF resins), melamine-formaldehyde resins (MF resins) or melamine-containing urea-formaldehyde resins (MUF resins), wherein the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Further very preferred aminoplast resins are urea-formaldehyde resins (UF resins), wherein the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Said aminoplast resins are usually used in liquid form, generally suspended in a liquid suspending medium, preferably in aqueous suspension, but can also be used as a solid.

The solids content of the aminoplast resin suspensions, preferably aqueous suspension, is usually from 25 to 90% by weight, preferably from 50 to 70% by weight.

The solids content of the aminoplast resin in aqueous suspension can be determined according to Günter Zeppenfeld, Dirk Grunwald, Klebstoffe in der Holz- and Möpelin-dustrie, 2nd edition, DRW-Verlag, page 268. For determining the solids content of aminoplast glues, 1 g of aminoplast glue is accurately weighed into a weighing dish, finely distributed on the bottom and dried for 2 hours at 120° C. in a drying oven. After thermostating at room temperature in a desiccator, the residue is weighed and is calculated as a percentage of the weight taken.

The aminoplast resins are prepared by known processes (cf. abovementioned Ullmann literature "Aminoplaste" and "Amino Resins" and abovementioned literature Dunky et al.) by reacting the compounds containing carbamide groups, preferably urea and/or melamine, with the aldehydes, preferably formaldehyde, in the desired molar ratios of carbamide group to aldehyde, preferably in water as a solvent.

The desired molar ratio of aldehyde, preferably formaldehyde, to amino group optionally partly substituted by organic radicals can be established by addition of monomers carrying —NH$_2$ groups to prepared, preferably commercial, formaldehyde-richer aminoplast resins. Monomers carrying NH$_2$ groups are preferably urea, melamine, particularly preferably urea.

The resin constituents of the binder C) can be used by themselves, i.e. for example aminoplast resin as the only resin constituent of binder C) or organic isocyanate as the only resin constituent of binder C) or PF resin as the only constituent of binder C).

The resin constituents of binder C) can, however, also be used as a combination of two or more resin constituents of binders C); preferably, these combinations comprise an aminoplast resin and/or phenol-formaldehyde resin.

The total amount of binders C), based on the wood-containing material, is in the range from 1 to 50% by weight, preferably from 2 to 15% by weight, particularly preferably from 3 to 10% by weight.

Here, the total amount of the aminoplast resin (always based on the solid), preferably of the urea-formaldehyde resin and/or melamine-urea-formaldehyde resin and/or melamine-formaldehyde resin, particularly preferably urea-formaldehyde resin, in the binder C), based on the lignocellulose-containing, preferably wood-containing material, is in the range from 1 to 45% by weight, preferably 4 to 14% by weight, particularly preferably 6 to 9% by weight.

Here, the total amount of the organic isocyanate, preferably of the oligomeric isocyanate having 2 to 10, preferably 2 to 8, monomer units and on average at least one isocyanate group per monomer unit, particularly preferably PMDI, in the binder C), based on the lignocellulose-containing, preferably wood-containing material, is in the range from 0 to 5% by weight, preferably from 0.1 to 3.5% by weight, particularly preferably from 0.5 to 1.5% by weight.

The ratios of the aminoplast resin to the organic isocyanate are obtained from the above-described ratios of the aminoplast resin binder to lignocellulose-containing, preferably wood-containing material or of the organic isocyanate binder to lignocellulose-containing, preferably wood-containing material.

Further commercially available additives and additives known to the person skilled in the art may optionally be present as component D) in the lignocellulose-containing, preferably wood-containing material according to the invention or the multilayer lignocellulose material, preferably multilayer wood-base material, according to the invention, for example water repellents, such as paraffin emulsions, antifungal agents, formaldehyde scavengers, for example urea or polyamines, and flameproofing agents.

The present invention further relates to a process for the production of a multilayer lignocellulose material which comprises at least three layers, either only the middle layer or at least part of the middle layer comprising a lignocellulose-containing material as defined above or, in addition to the middle layer or at least part of the middle layer, at least one further layer comprising a lignocellulose-containing material as defined above, the components for the individual layers being placed in layers one on top of the other and being pressed at elevated temperature and under elevated pressure.

The average density of the multilayer lignocellulose material, preferably of the three-layer lignocellulose material according to the invention, preferably wood-base material, is as a rule not critical.

Usually, multilayer lignocellulose materials, preferably three-layer lignocellulose materials, preferably wood-base materials, according to the invention which have a relatively high density have an average density in the range from at least 600 to 900 kg/m$^3$, preferably from 600 to 850 kg/m$^3$, particularly preferably from 600 to 800 kg/m$^3$.

Usually, low-density multilayer lignocellulose materials, preferably three-layer lignocellulose materials according to the invention, preferably wood-base materials, have an average density in the range from 200 to 600 kg/m$^3$, preferably from 300 to 600 kg/m$^3$, particularly preferably from 350 to 500 kg/m$^3$.

Preferred parameter ranges and preferred embodiments with regard to the average density of the lignocellulose-containing, preferably wood-containing material and with regard to the components and the preparation processes A), B), C) and D) thereof and the combination of the features correspond to the above description.

Middle layers in the context of the invention are all layers which are not the outer layers.

In one embodiment, at least one of the outer layers (usually referred to as "covering layer(s)") comprises expanded plastic particles B).

In a further embodiment, at least one of the outer layers (usually referred to as "covering layer(s)") comprises no expanded plastic particles B).

In a preferred embodiment, the outer layers (usually referred to as "covering layer(s)") comprise no expanded plastic particles B).

The multilayer lignocellulose material, preferably multilayer wood-base material, according to the invention preferably comprises three lignocellulose layers, preferably wood-base layers, the outer covering layers together as a rule being thinner than the inner layer(s).

The binder used for the outer layers is usually an aminoplast resin, for example urea-formaldehyde resin (UF), melamine-formaldehyde resin (MF), melamine-urea-formaldehyde resin (MUF) or the binder C) according to the invention. Preferably, the binder used for the outer layers is an aminoplast resin, particularly preferably a urea-formaldehyde resin, very particularly preferably an aminoplast resin in which the molar ratio of formaldehyde to —NH$_2$ groups is in the range from 0.3 to 1.0.

The thickness of the multilayer lignocellulose material, preferably multilayer wood-base material, according to the invention varies with the field of use and is as a rule in the range from 0.5 to 100 mm; preferably in the range from 10 to 40 mm, in particular from 15 to 20 mm.

The processes for the production of multilayer wood-base materials are known in principle and are described, for example, in M. Dunky, P. Niemz, Holzwerkstoffe and Leime, Springer 2002, pages 91 to 150.

An example of a process for the production of a multilayer wood-base material according to the invention is described below.

After comminution of the wood to give chips, the chips are dried. Thereafter, coarse and fine fractions are then optionally removed. The remaining chips are sorted by screening or classification in an air stream. The coarser material is used for the middle layer and the finer material for the covering layers.

Middle layer and covering layer chips are glue-coated or mixed, in each case separately from one another, with the components B) (only middle layer(s) or middle layer(s) and at least one covering layer), C) (identical or different for middle layer(s) and covering layer(s)) and optionally D) (middle layer and/or covering layers) and then sprinkled.

First, the covering layer material is sprinkled onto the molding belt, then the middle layer material—comprising the components B), C) and optionally D)—and finally once again covering layer material. The three-layer chip cake thus produced is precompressed in the cold state (as a rule at room temperature) and then pressed at elevated temperature.

The pressing can be effected by all methods known to the person skilled in the art. Usually, the wood particle cake is pressed to the desired thickness at a press temperature of from 150° C. to 230° C. The duration of pressing is usually from 3 to 15 seconds per mm board thickness. A three-layer particle board is obtained.

EXAMPLES

A1) Preparation of the Expanded Polystyrene

Neopor® 2200 (Neopor® is a commercial product and trademark of BASF SE) was treated with steam in a continuous preexpander. The bulk density of 50 kg/m³ of the preexpanded polystyrene spheres was established by varying the steam pressure and the steam treatment time.

A2) Preparation of the Expanded Polystyrene with Formaldehyde Scavenger Component 1 part by weight, based on the solid, of the adhesive (polymer dispersion Acronal S 790:50% strength by weight aqueous dispersion of a polymer based on acrylate and styrene) and 3 parts by weight, based on the solid, of urea as a 33% strength by weight aqueous solution were thoroughly mixed at room temperature. This gave a turbid aqueous mixture which could be applied.

400 g of the bead-expanded polystyrene obtained in A1) were initially taken in a 10 l bucket and mixed with 80 g of the turbid aqueous formaldehyde scavenger component described above and 8 g of water at room temperature for from 5 to 30 minutes. The mixture thus obtained was introduced into gauze baskets and left to dry in an air stream at room temperature until the beads no longer appeared tacky. The applied formaldehyde scavenger material was determined by determining the nitrogen content (Kjeldahl).

A3) Preparation of the Expanded Polystyrene with Formaldehyde Scavenger Component by Extrusion A3.1.1) Production of a Sodium Sulfite ($Na_2SO_3$)-Containing Extrudate In an extruder, 72.8 parts by weight of polystyrene 158 K (BASF SE) and 20 parts by weight of sodium sulfite ($Na_2SO_3$, BASF SE), 0.2 part by weight of the polyethylene wax (Luwax AH3, BASF SE) were mixed together with 7 parts by weight of pentane (a commercially available pentane isomer mixture comprising n-pentane and isopentane) with a temperature profile in the range from 170° C. to 250° C. The resulting polymer melt was transported through a die plate and pelletized with the aid of underwater pelletizing under pressure to give expandable particles.

A3.1.2) Foaming of the Expandable Particles

The expandable particles obtained in A3.1.1) were treated with steam in a continuous conventional preexpander. By varying the steam pressure and the steam treatment time, a bulk density of 50 kg/m³ of the expanded polystyrene particles was established.

A3.2.1) Production of a Polyethylenimine-Containing Extrudate ("Formaldehyde Scavenger Batch")

In an extruder, 80 parts by weight of polystyrene 158 K (BASF SE) and 20 parts by weight of anhydrous polyethylenimine (Lupasol G20, BASF SE) were mixed with a temperature profile in the range from 170° C. to 250° C.

The resulting polymer melt was transported through a die plate and pelletized.

A3.2.2) Production of a Polyethylenimine-Containing Expandable Extrudate

In an extruder, 46.5 parts by weight of polystyrene 158 K (BASF SE), 46.5 parts by weight of the composition corresponding to A 3.2.1), 0.2 part by weight of polyethylene wax (Luwax AH3, BASF SE) were mixed together with 6.8 parts by weight of pentane (a commercially available pentane isomer mixture comprising n-pentane and isopentane) with a temperature profile in the range from 170° C. to 250° C. The resulting polymer melt was transported through a die plate and pelletized with the aid of underwater pelletizing under pressure to give expandable particles.

A3.2.3) Foaming of the Expandable Particles

The expandable particles obtained in A 3.2.2) were treated with steam in a continuous conventional preexpander. By varying the steam pressure and the steam treatment time, a bulk density of 50 kg/m³ of the expanded polystyrene particles was established.

The results are listed in Table 1.

TABLE 1

Expanded polystyrene with formaldehyde scavenger component

| Batch No. | according to example | Formaldehyde scavenger | Amount of formaldehyde scavenger in the polystyrene particle |
|---|---|---|---|
| 1 | A2) | Urea | 10.4% [1] |
| 2 | A3.1.2) | $Na_2SO_3$ | 20% [2] |
| 3 | A3.2.3) | Polyethylenimine (PEI) | 9.2% [2] |

[1] Determined by nitrogen analysis of the expanded polystyrene particle
[2] Based on the unexpanded polystyrene particles. Amount of formaldehyde scavenger determined by calculation, based on the amounts of substances used.

B) Production of a Multilayer Wood-Base Material with Component B) Using Urea-formaldehyde Glues B1) Glue Liquors for the Corresponding Layers The glue used was Kaurit® glue KL 347 from BASF SE, a UF resin. The glue was mixed with further components (see following table) to give a glue liquor. The compositions of the aqueous glue liquors for the covering layer and the middle layer are shown in the following table.

TABLE 2

Glue liquors for covering layer and middle layer

| Components | Covering layer (parts by weight) | Middle layer (parts by weight) |
|---|---|---|
| KML 347 liquid | 100.0 | 100.0 |
| Ammonium nitrate solution (52% strength) | 1.0 | 4.0 |
| Urea, solid | 0.5 | 1.3 |
| Water | 0.5 | 0.8 |

B2) Production of the Three-Layer Wood-Base Materials According to the Invention The glue-coating and the pressing of the wood chips were effected analogously to customary methods for the production of particle boards.

B2.1) Production of the Middle Layer Material

In a mixer, coarse spruce chips, optionally expanded polystyrene (prepared according to A2), A3), cf. also Table 1 above) were mixed with the glue liquor for the middle layer (according to Table 2 above) so that the amount of glue (as solid) was 8.5% by weight, based on absolutely dry wood plus expanded polystyrene.

The amount of expanded polystyrene is based on the total amount of absolutely dry wood plus expanded polystyrene and is shown in Table 3.

B2.2) Glue-Coating of the Covering Layer Material

In a mixer, fine spruce chips were mixed with the glue liquor for the middle layer (according to Table 2 above) so that the amount of glue (as solid) was 8.5% by weight, based on absolutely dry wood.

B 2.3) Pressing of the Glue-Coated Chips

The material for the production of a three-layer particle board was sprinkled into a 30×30 cm mold. First, the covering layer material, then the middle layer material and finally once again the covering layer material were sprinkled. The total mass was chosen so that the desired density at a required thickness of 16 mm results at the end of the pressing process. The mass ratio (weight ratio) of covering layer material to middle layer material to covering layer material was 17:66:17 in all experiments. The covering layer material used was the mixture described above under B2.2). The middle layer material used was the mixture described above under B2.1).

After the sprinkling, precompression was effected at room temperature, i.e. in the "cold" state, followed by pressing in a hot press (pressing temperature 210° C., pressing time 210 s). The required thickness of the board was 16 mm in each case.

C) Investigation of the Wood-Containing Material

C 1) Density

The density was determined 24 hours after production, according to DIN EN 1058.

C 2) Transverse Tensile Strength

The transverse tensile strength was determined according to DIN EN 319.

C 3) Formaldehyde Emission was Measured According to EN 120

The results of the experiments are listed in Table 3.

The quantity data are always based on the dry substance. In the case of the data in parts by weight, the dry wood or the sum of the dry wood and component B) is set at 100 parts. In the case of the data in % by weight, the sum of all dry constituents of the wood-containing material is equal to 100%.

The experiments in Table 3 without addition of component B) or with addition of polystyrene without formaldehyde scavenger according to Example A1) serve for comparison.

TABLE 3

Experimental results

| | Three-layer wood-base material according to the invention with addition of component B according to batch | | | Three-layer wood-base material with addition of polystyrene without formaldehyde scavenger | Three-layer wood-base material without addition of |
|---|---|---|---|---|---|
| | 1 | 2 | 3 | (according to Example A1) | component B) |
| Additives in middle layer ("ML") | 10% by weight | 10% by weight | 10% by weight | 10% by weight | None |
| Density, kg/m³ | 517 | 528 | 522 | 518 | 533 |
| Transverse tensile strength, N/mm² | 0.58 | 0.57 | 0.63 | 0.61 | 0.44 |
| Formaldehyde according to EN 120, mg HCHO/100 g of absolutely dry sample | 3.0 | 3.9 | 1.3 | 5.6 | 5.9 |

We claim:

1. A process for the production of a lignocellulose-containing material comprising mixing the following components:
   A) from 30 to 95% by weight of lignocellulose particles;
   B) from 1 to 25% by weight of expanded plastic particles having a bulk density in the range from 10 to 150 kg/m³;
   C) from 1 to 50% by weight of a binder selected from the group consisting of aminoplast resin, phenol-formaldehyde resin and organic isocyanate having at least two isocyanate groups, and optionally
   D) additives,
   based in each case on the lignocellulose-containing material, to form a mixture, and pressing the mixture at elevated temperature and under elevated pressure, wherein component B) comprises a formaldehyde scavenger.

2. The process according to claim 1, the lignocellulose particles being wood particles.

3. The process according to 1, the component B) being selected from the group consisting of styrene homopolymer and styrene copolymer.

4. The process according to claim 1, the formaldehyde scavenger being selected from the group consisting of chemical compounds of any molecular weight, the chemical compounds comprising at least one N atom having at least one free electron pair, and sulfur-containing salts.

5. A process for the production of a multilayer lignocellulose material which comprises at least three layers, either only the middle layer or at least part of the middle layer comprising a lignocellulose-containing material as defined in claim 1 or, in addition to the middle layer or at least part of the middle layer, at least one further layer comprising the light lignocellulose-containing material, the components for the individual layers being placed in layers one on top of the other and being pressed at elevated temperature and under elevated pressure.

6. The process according to claim 5, at least one of the outer covering layers comprising expanded plastic particles B).

7. The process according to claim 1, at least one of the outer covering layers comprising no expanded plastic particles B).

8. A lignocellulose-containing material, obtainable by a process as defined in claim 1.

9. A multilayer lignocellulose material, obtainable by a process as defined in claim 5.

10. A method of preparing articles of all kinds in the construction sector comprising utilizing a lignocellulose-containing material according to claim 8.

11. A method of preparing an article comprising utilizing the lignocellulose-containing material according to claim 8, wherein the article is furniture, furniture parts, packaging materials, in house construction, in interior finishing or in motor vehicles.

12. Expanded plastic particles having a bulk density in the range from 10 to 150 $kg/m^3$, comprising a formaldehyde scavenger.

13. A method of producing a lignocellulose-containing molding comprising utilizing an expanded plastic particle as defined in claim 12.

14. A method of preparing articles of all kinds in the construction sector comprising utilizing the multilayer lignocellulose material according to claim 9.

15. A method of preparing an article comprising utilizing the lignocellulose material according to claim 9, wherein the article is furniture, furniture parts, packaging materials, in house construction, in interior finishing or in motor vehicles.

16. The process according to claim 2, the component B) being selected from the group consisting of styrene homopolymer and styrene copolymer.

17. The process according to claim 2, the formaldehyde scavenger being selected from the group consisting of chemical compounds of any molecular weight, the chemical compounds comprising at least one N atom having at least one free electron pair, and sulfur-containing salts.

18. The process according to claim 3, the formaldehyde scavenger being selected from the group consisting of chemical compounds of any molecular weight, the chemical compounds comprising at least one N atom having at least one free electron pair, and sulfur-containing salts.

19. A process for the production of a multilayer lignocellulose material which comprises at least three layers, either only the middle layer or at least part of the middle layer comprising a lignocellulose-containing material as defined in claim 2 or, in addition to the middle layer or at least part of the middle layer, at least one further layer comprising the light lignocellulose-containing material, the components for the individual layers being placed in layers one on top of the other and being pressed at elevated temperature and under elevated pressure.

20. A process for the production of a multilayer lignocellulose material which comprises at least three layers, either only the middle layer or at least part of the middle layer comprising a lignocellulose-containing material as defined in claim 3 or, in addition to the middle layer or at least part of the middle layer, at least one further layer comprising the light lignocellulose-containing material, the components for the individual layers being placed in layers one on top of the other and being pressed at elevated temperature and under elevated pressure.

21. A process for the production of a lignocellulose-containing material comprising mixing the following components:
A) from 30 to 95% by weight of lignocellulose particles;
B) from 1 to 25% by weight of expanded plastic particles having a bulk density in the range from 10 to 150 $kg/m^3$;
C) from 1 to 50% by weight of a phenol-formaldehyde resin having at least two isocyanate groups, and optionally
D) additives,
based in each case on the lignocellulose-containing material, to form a mixture, and pressing the mixture at elevated temperature and under elevated pressure, wherein component B) comprises a formaldehyde scavenger.

* * * * *